INVENTORS.
ROBERT G. CLAPHAM
JOHN B. LORD IV
BY HAROLD G. SULLIVAN
Bruce C Lutz
ATTORNEY INVENTORS.
ROBERT G. CLAPHAM
JOHN B. LORD IV
BY HAROLD G. SULLIVAN
Bruce C. Lutz
ATTORNEY INVENTORS.
ROBERT G. CLAPHAM
JOHN B. LORD IV
BY HAROLD G. SULLIVAN
Bruce C. Lutz
ATTORNEY INVENTORS.
ROBERT G. CLAPHAM
JOHN B. LORD IV
BY HAROLD G. SULLIVAN
Bruce C Lutz
ATTORNEY United States Patent Office 3,445,771
Patented May 20, 1969

3,445,771

AUTOMATIC DATA CHANNEL EQUALIZATION APPARATUS UTILIZING A TRANSVERSAL FILTER

Robert G. Clapham, Seattle, John B. Lord IV, Edmonds, and Harold G. Sullivan, Seattle, Wash., assignors to Honeywell Inc., Minneapolis, Minn., a corporation of Delaware Filed Feb. 28, 1966, Ser. No. 530,515
Int. Cl. H04b 1/10, 3/04
U.S. Cl. 325—42 6 Claims

ABSTRACT OF THE DISCLOSURE

A technique and circuit for automatically providing equalization for distortion of signals through a communication circuit. This is accomplished utilizing a delay line which is continuously adjusted to provide a zero average output for all portions of a signal except that portion reaching a predetermined intermediate tap on the delay line. The technique as shown is implemented both in digital and analog versions.

Figure 1:
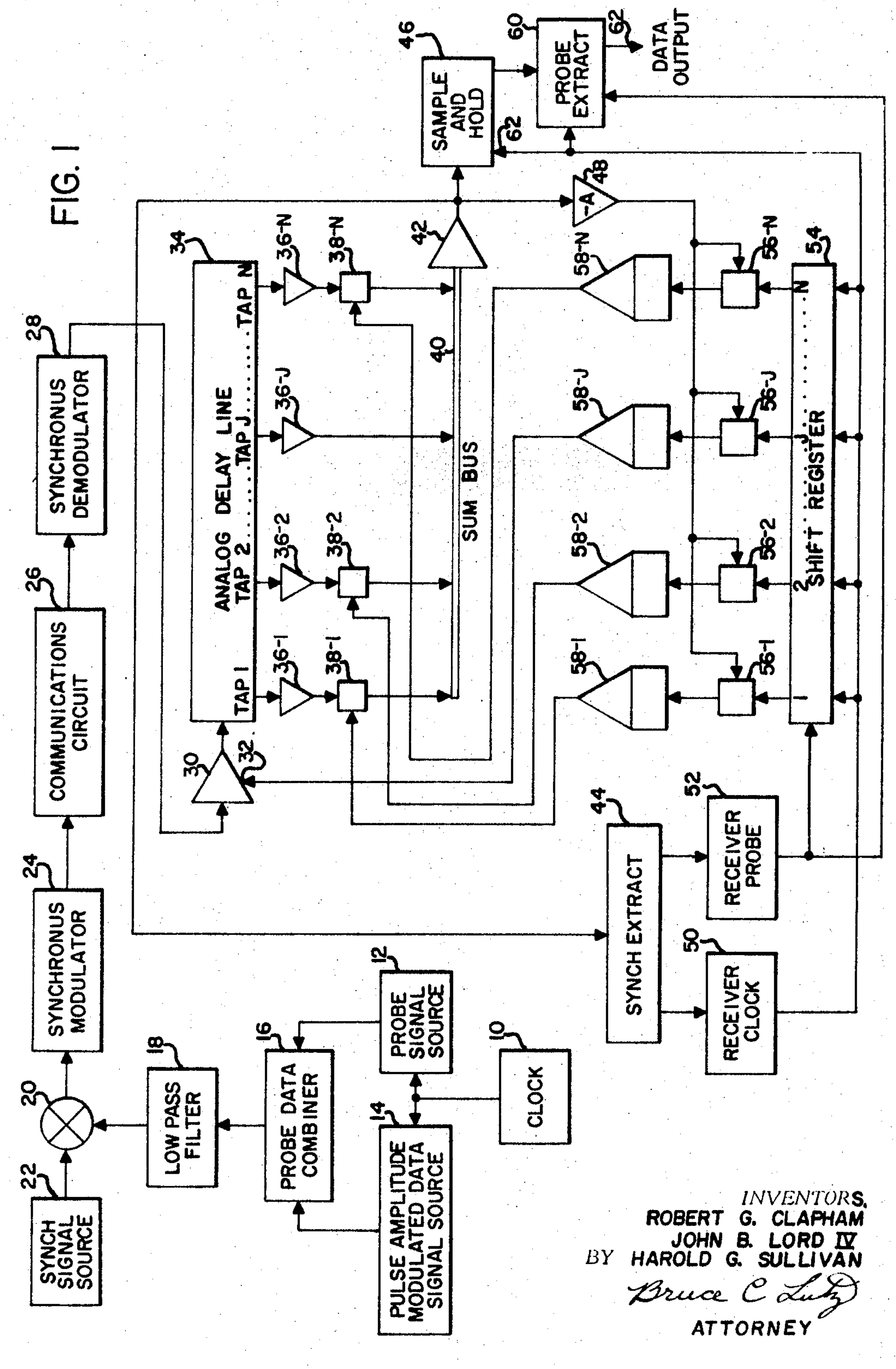

The present invention is generally concerned with communications equipment and is more particularly concerned with a method for automatically equalizing a distorted signal which is distorted due to data channel characteristics.

The prior art has many methods for overcoming the problems concerning distortion of signals through a channel. Most of these are in the form of a delay line or some other device which provides an "inverse" function of the channel characteristics so as to attempt to provide an output signal with characteristics similar to that provided to the input of the data channel. This method will operate only for known data channels which do not change characteristics. One example of an automatic method of providing this so-called "inverse" characteristic is an application in the name of one of the present inventors, John Lord, S.N. 446,963, filed Apr. 9, 1965, and assigned to the same assignee as the present invention.

In general, the present invention utilizes a prescribed data signal in combination with a probe signal and some type of synchronizing signal. The data signal must be of the type which is described as pulse amplitude modulated with an average of zero. For most applications of the invention, the data link between the transmitter and receiver must use synchronous modulation-demodulation techniques for transmitting the signal. At the receiver, the signal is transmitted through a delay line. In the analog embodiment of the invention, the delay line is similar to that used for ordinary requirements. In the digital version, the delay line comprises a shift register storage unit. The delay line has N taps wherein $N-1$ of the taps are connected to some type of multiplier or signal adjustment means. The outputs from all of the multipliers and the remaining tap are summed and the summation information is fed back to adjust each of the multipliers so that the average output at the summing means is zero when the probe pulse appears at each of the $N-1$ taps. When the probe signal appears at the remaining tap, the output from the summing means is utilized to adjust the gain of the receiver. In this way, the probe signal is maintained at the constant amplitude and the outputs from the delay line are adjusted so that as a probe pulse travels through the delay line, the total average output from the summing means remains at zero during the sampling times except when the probe pulse appears at the single tap from which the signal is unadjustable. An output circuit in the receiver removes the probe signal from the signal received from the summing means and thus provides an output which is identical to the signal source.

As will be determined from the following description, the analog and digital embodiments while different is detail both employ the same basic idea in their operation.

It is therefore an object of the present invention to provide apparatus which will automatically equalize a data channel.

Figure 2:
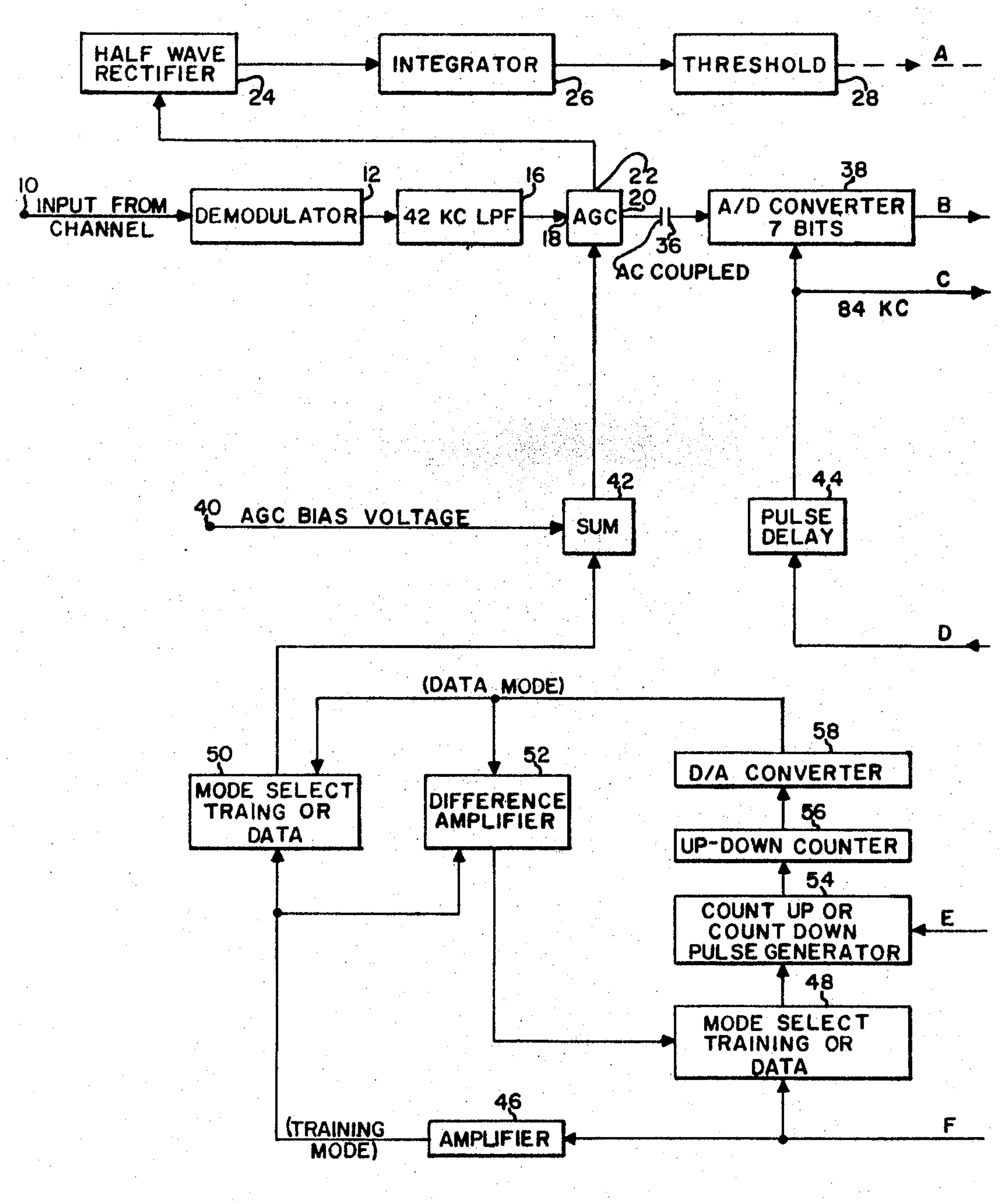
Figure 3:
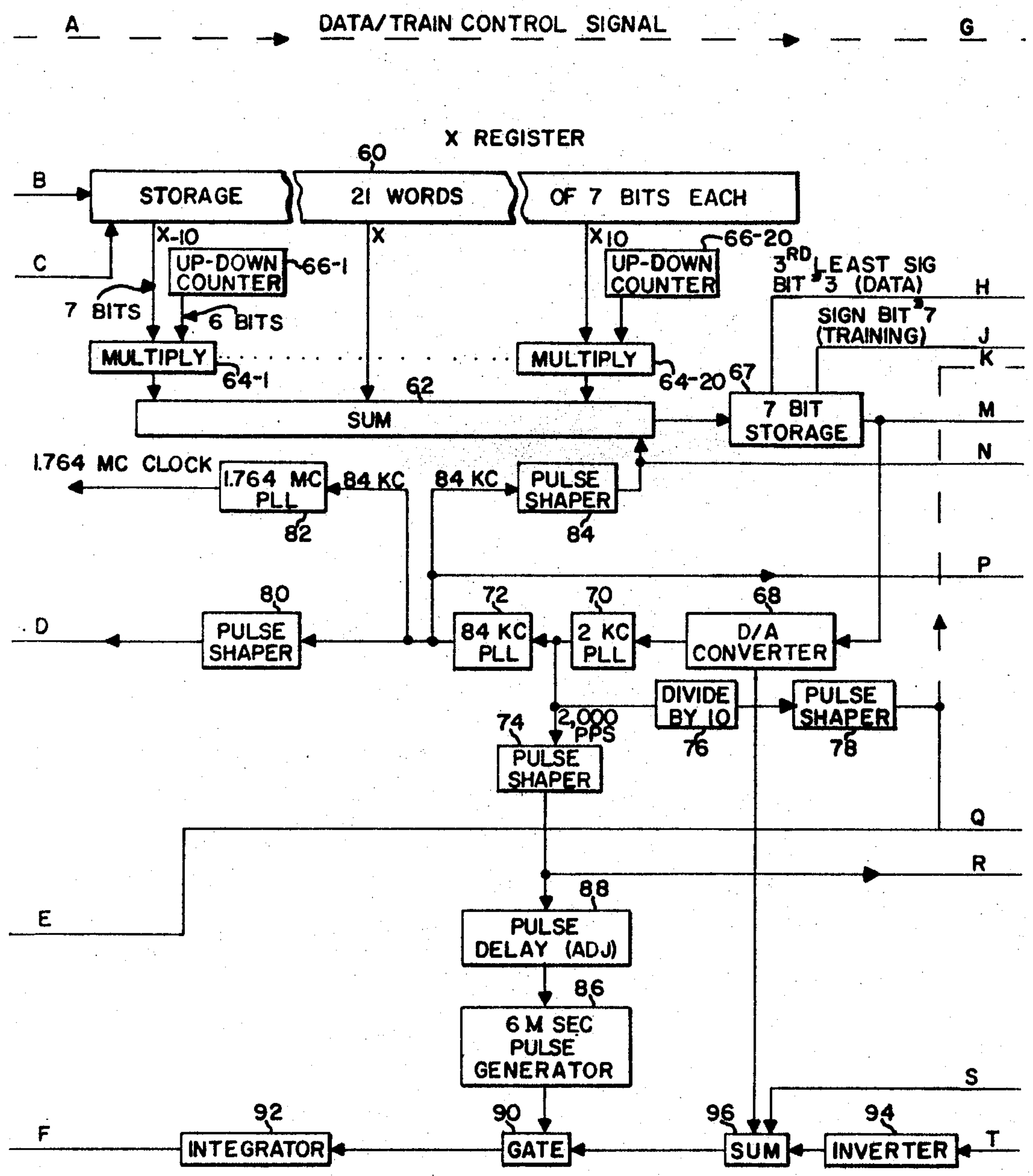
Figure 4:
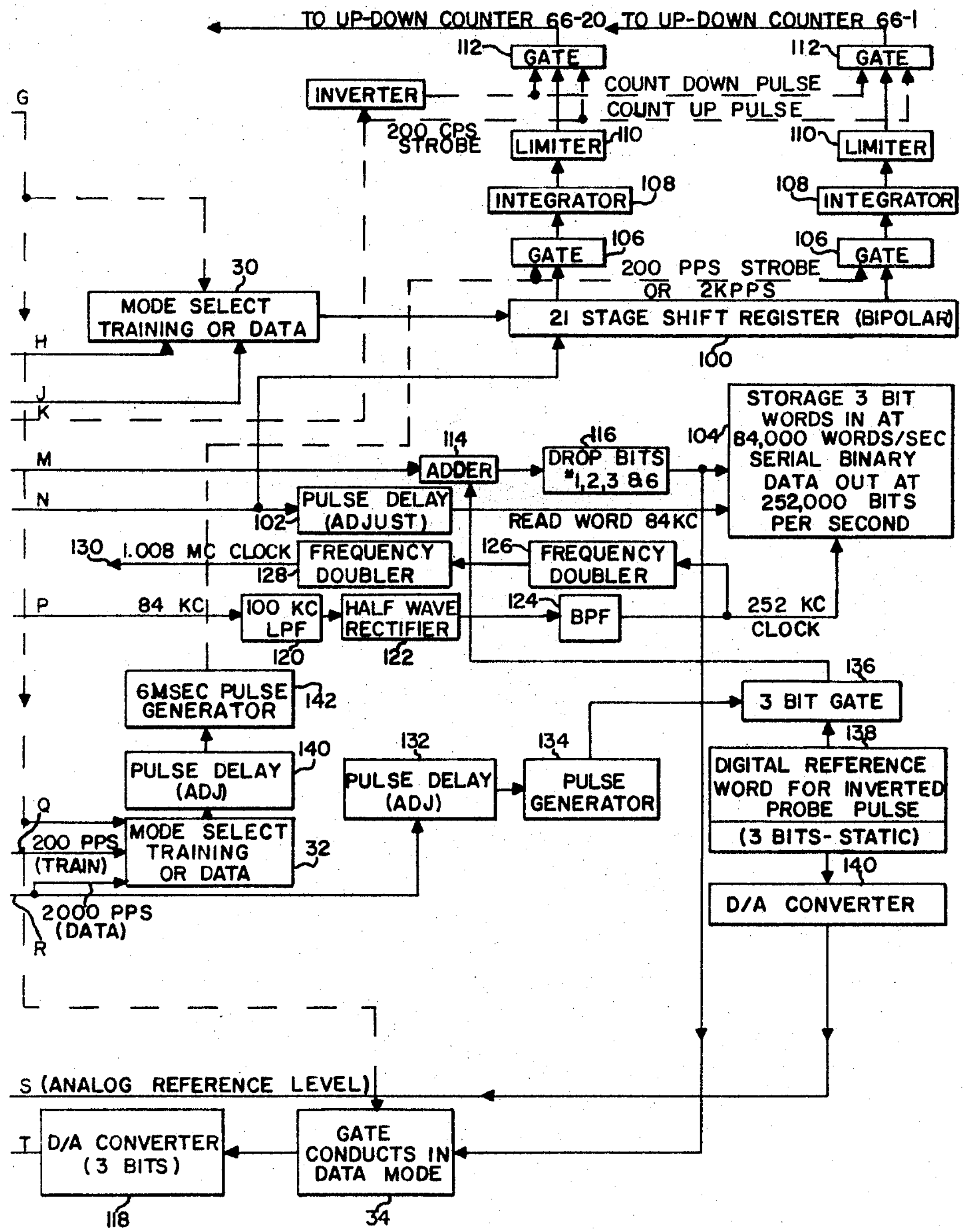

Other objects and advantages may be ascertained from the specification and appended claims in conjunction with the drawings in which:

FIGURE 1 is a block diagram representation of an analog version of the automatic channel equalizer; and FIGURES 2, 3, and 4 together represent the block diagram form of the digital version of the automatic channel equalizer.

DESCRIPTION OF FIGURE 1

In FIGURE 1 a clock 10 provides an output to a probe signal source 12 and also to a pulse amplitude modulated data signal source 14. The unit 14 provides a statistically independent, pulse amplitude modulated signal having an average of zero. The outputs from blocks 12 and 14 are both supplied to a probe data combiner 16 which has an output passing through a low pass filter 18 to a summing means 20. The low pass filter is used to limit the data probe spectrum to be compatible with the data link through which the information is being transmitted. A synchronization signal source 22 also supplies a signal to summing means 20. An output from summing means 20 is supplied serially through a synchronous modulator 24, a communications circuit 26 and a synchronous demodulator 28. The last mentioned units 24–28 comprise the data link which may be the telephone line or some transmission medium such as air. An output from the synchronous demodulator 28 is supplied to an input of an automatic gain control amplifier 30 which has a control input 32. An output of amplifier 30 is supplied to an analog delay line 34. Analog delay line 34 has many taps labeled from tap 1 to tap N and also including an intermediate tap J. A plurality of amplifiers are labeled 36–1 to 36–N. One each of these amplifiers is connected to each of the respective corresponding taps. A plurality of four quadrant analog multiplying circuits are each designated from 38–1 to 38–N and one of each is connected to each of the amplifiers 36 except the one connected to tap J. Each of the multiplying circuits has a second input to be multiplied against the input received from the corresponding amplifier 36. An output of each of the multiplying circuits 38 is connected to a summing bus 40. The output of amplifier 36–J is also connected to summing bus 40. Summing bus 40 provides an input to an amplifier 42 which is part of the summing bus 40 and which has an output connected to an input of a synchronization extracting circuit 44, to an input of a sample and hold circuit 46 and also to an input of an inverting amplifier 48. Synchronization extract circuit 44 has two outputs one of which is applied to a receiver clock circuit 50 and the other of which is applied to the receiver probe circuit 52. The clock pulses from block 50 are connected to provide inputs to sample and hold circuit 46, to a probe extract circuit 60 and to a shift register 54 having N inputs and N outputs. The probe signal from receiver probe block 52 is connected to an input of shift register 54 to actuate the shift register and start the shifting of the clock pulses to successive output taps of the shift register 54. Each of the outputs of the shift register 54 is connected to a respective gate from 56–1 and 56–N. The gates 56 are actuated by the signals from shift register 54 and allow passage of a signal from amplifier 48 which has its output connected to each of the gates 56 through the gates 56 to corresponding integrating amplifiers 58–1 to 58–N.

Each of the integrating amplifiers 58 has an output thereof connected to supply signals to the corresponding multiplying circuit 38 with the exception of the integrating amplifier 58–J. Integrating amplifier 58–J has its output connected to control the gain of the automatic gain control amplifier 30 and is connected to input 32 thereof. The output of receiver probe circuit 52 in addition to being connected to supply a probe signal to the shift register 54 also supplies an input to a probe extract circuit 60. An output of the sample and hold circuit 46 is also connected to the probe extract circuit 60 which has an information output means 62.

OPERATION OF FIGURE 1

As previously mentioned, the purpose of this invention is to equalize a data link. The equalizer operates to reduce the intersymbol interference of the data being transmitted. A probe signal is combined with the data at the transmitter so that the data link may be equalized automatically and continuously while data is being transmitted and then the probe signal is removed at the receiver.

The probe signal supplied by block 12 consists of a series of single pulses spaced in time and identical in shape to a data pulse but always of the same amplitude. This pulse amplitude will be set close to the maximum level of the data signal and repeated every N data pulses. The factor N is determined by the combined impulse response length of the data link and the equalizing filter.

The probe signal and the data signal may be combined in any of several ways two of which will be mentioned. One method, which may be entitled the "Probe Addition" method, adds the probe and the data linearly. The output of the probe data combiner 16 is the linear sum of the data signal and the probe signal. The second method, named the "Probe Insertion" method, reclocks the data to a slightly faster rate and inserts the probe pulse periodically in the data stream. If the probe is sent every Nth data pulse, the data is reclocked so that the N data samples occur in a time equal to $N-1$ original data samples. The extra sample interval gained each N sample times is used for probe insertion.

The combined signal is then passed through the low pass filter 18 to limit the data probe spectrum to be compatible with the data link bandwith. A synchronization signal supplied by sync source 22 is combined in the summing circuit 20 and sent through the data link. The data link must be of a type which uses synchronous modulation and demodulation to prevent rapid fluctuations of the data link due to relative frequency and/or phase drifts of the carrier oscillators. This is normally a requirement even though the invention will equalize data links which are changing with time.

The equalizer comprises two parts one of which could be termed the "equalizing filter" which includes the components designated as 30–42. The remaining equipment, for the most part, is the measurement section.

The equalizing filter is automatically adjusted to equalize the data link and is synthesized using a tapped delay line. The desired filter characteristic is obtained by a weighted sum of the tap output of the delay line. This sum is obtained using a resistive adder circuit within the sum bus 40.

The measurement section is used to establish the tap weights needed for the equalizing filter. These tap weights are established by measuring the composite impulse response of the data link and the equalizing filter appearing at the output of amplifier 42 and adjusting the equalizing filter tap weights through multipliers 38 to reduce the intersymbol interference in the data output of the equalizer. As defined in this specification, intersymbol interference is the interference obtained at the sampling times.

While the following description will be presented on a step by step basis, it should be realized that the apparatus uses feedback so that the adjustment process is actually continuous.

It will be assumed that the equalization filter is in some state which does not properly equalize the input signal. The synchronization extraction circuit 44 provides information through the receiver probe circuit 52 as to when a probe pulse has been received. The time wave form at the output of amplifier 42 which has been received from the equalizing filter will contain the composite response of the data link and the equalizing filter to the probe pulse. This output will also contain the response due to the data pulses. The composite signal is sent as previously mentioned both to the sync extract circuit 44 and the inversion amplifier 48.

The sync extract circuit 44 in combination with the receiver clock 50 and the receiver probe circuit 52 synchronizes the receiver clock and the receiver probe to the wave form from the transmitter. The receiver probe signal is generated J sample time before the main response of the probe is obtained in the equalizing filter output. This can be accomplished because the probe is periodic. The method of synchronization used in block 44 is not pertinent to the invention but may be any type of synchronizing apparatus performing the desired function.

The receiver probe signal from block 52 is used as an input to the shift register 54 and stepped through the shift register at a sample rate by the receiver clock pulses obtained from block 50. The output of each shift register stage is used to drive the analog gates 56 so as to cause the gates 56 to be operated sequentially at the sample rate starting with the gate connected to output 1 of the shift register 54.

The other input to gate 56 is the amplifier feedback signal obtained from the inverted amplifier 48. The signal passed through the gates 56 to the corresponding integrating amplifiers 58 contains samples of the amplified composite probe response of the data link plus the equalizing filter. The composite pulse response is sampled at a rate equal to the data sample rate. Each gate 56 takes a sample each time a probe pulse is received. These samples also contain response to the data, however, since the average of the data signal is zero, over a long period of time these individual data signals have no effect on the output of the integrating amplifiers 58. If the channel were equalized, the output of each of the integrators 58 would be constant.

The outputs of the integrating amplifiers 58 are used to adjust each of the multiplying circuits 38 to provide essentially zero average total output voltage from the summing bus 40 at each sample time as the probe pulse passes along the delay line 34 except when the probe reaches the J tap. The integrator 58–J adjusts amplifier 30 against a reference voltage (not shown) to keep the gain through the system at a relatively constant value. When the system is equalized, the only effective output obtained from the analog delay line to the summing bus 40 is that obtained through amplifier 36–J when the probe pulse reaches the Jth tap.

The output from amplifier 42 is sampled and held by block 46 for a sample period. This sample and hold circuit may actually be an analog to digital converter. From the synchronization extraction circuit 44 it is known which of the samples contain the probe. Since the system has been equalized, only one sample corresponding to each transmitted probe pulse contains the probe signal. Also, since the gain of the system has been maintained constant by the automatic gain control circuit utilizing amplifier 30, the amplitude of the probe is known. If the previously mentioned probe addition method has been used, the probe can now be linearly subtracted from the sampled data in the probe extraction circuit 60. If the probe insertion method has been used, the pulse corresponding to the probe can be eliminated from the output by probe extraction circuit 60 and the data reclocked to the original data rate by means (not shown) which may be internal to the probe extraction circuit 60.

While the above described channel equalizer will compensate for changing delay characteristics in the data link, the parameters of the equalizer must be tailored to fit the general characteristics of the data link with which it is to operate. The data sample rate determines the tap spacing of the delay line 34. Further, the typical and maximum length of the data length impulse response determines the delay line link and therefore the number of taps N.

As may be determined, the data link using the present invention is automatically equalized for changing data link conditions, further it is changed continuously and is equalized for both amplitude and phase distortion. Another advantage of the present invention is that the technique uses a type of probe signal which is easily removed in the receiver.

DESCRIPTION OF FIGURES 2, 3, AND 4

While the digital version of the equalizer performs the same operations on the data as does the analog embodiment, a fairly detailed version of the digital embodiment is being shown in view of the belief that it is not immediately obvious how to connect apparatus to provide this function in a digital form. While a detailed version of the digital embodiment is being shown, it is to be realized that this is not the only method of connecting various blocks to form a digital embodiment and that other versions are to be considered within the scope of the invention.

An input 10 supplies data from a communication circuit utilizing a synchronous modulator and data combining apparatus such as shown in FIGURE 1. Input 10 is connected to supply the signal to a synchronous demodulator 12. Demodulator 12 is connected through a 42 kc. low pass filter 16 to an input 18 of an automatic gain control (AGC) circuit 20. AGC 20 has an output 22 connected to a half wave rectifier 24. The half wave rectifier 24 is connected through an integrator 26 to a threshold detector 28 and then to an output A. It will be noted that each of the figures has letters on one or both edges. These letters correspond to similar letters on the other figures and are the direct connections therebetween since there is not room on one sheet of drawing to provide the complete unit. Thus, as an example the threshold detector of FIGURE 2 is connected to the point A on FIGURE 2 and also to the point A on FIGURE 3. Further, point A on FIGURE 3 is connected to point G on FIGURE 3 and to point G on FIGURE 4 and finally to a mode select training or data switch 30 in FIGURE 4 and also to a mode select training or data switch 32 in FIGURE 4 and finally to a gate 34 in FIGURE 4 which conducts only in the data mode of operation of the equalizer. AGC 20 is connected through a capacitor 36 to an *A/D* (analog to digital) converter 38 providing 7 bits of output information per input pulse to terminal B. A reference AGC bias voltage source 40 is connected to supply an input to a summing means 42 which has an output connected to a second input of the AGC unit 20. A terminal D is connected through a pulse delay block 44 to an output terminal C and also connected to provide an input to converter 38. The frequency of the signal on this line is 84 kc. A terminal F supplies inputs to an amplifier 46 and also to a mode select training or data switch 48. An output of amplifier 46 is connected to provide an input to a mode select training or data switch 50 and also to a difference amplifier 52. An output of difference amplifier 52 is connected to provide a second input to block 48. A terminal E is connected to provide an input to a count up or count down pulse generator 54. Block 48 is connected through block 54 to an up-down counter 56 which is further connected to provide a signal to a *D/A* converter 58. An output of block 58 is connected both to the difference amplifier 52 and to the switch 50. An output of switch 50 is connected to supply a second input to the summing means 42.

In FIGURE 3 it will be noted, as previously mentioned, that terminal A is connected directly to terminal G. Terminal B is connected to an X register 60 which provides storage for 21 words of 7 bits each. Terminal B supplies a data signal from FIGURE 2 while a second input is supplied from terminal C for gating the X register. While 21 words were used in one embodiment it is to be realized that the capacity of the storage unit in number of words depends upon the information being received and the amount of equalization required in the communications channel. For this particular register there are 21 outputs starting with $X_{-10}$ and ranging to $X_{10}$ with an intermediate terminal of X. While only the three mentioned taps or outputs are shown from the X register it is to be realized that there are 18 other taps not shown because of space limitations. Each of these taps are connected to a summing means 62 in a manner to be described. Tap $X_{-10}$ is connected to a multiply or adjusting circuit 64 which is further connected to the summing means 62. The multiply circuit 64–1 also receives an input from an up-down counter 66–1. The terminal $X_{10}$ is connected through a multiply circuit also labeled 64 (64–20) to the summing means 62. Multiply circuit 64–20 is also connected to an up-down counter which is labeled 66–20. Each of the taps of the storage register 60 is connected through a multiply circuit 64 except for tap X which is connected directly to the summing circuit 62. A data output of the summing means 62 is connected through a 7-bit storage unit 67 to terminal M and also to provide an input to a *D/A* converter 68. The 7-bit storage unit 67 also has further outputs connected to terminals H and J. The terminal H provides the third least significant bit No. 3 when the device is operating in the data receiving mode and terminal J is provided with the sign bit No. 7 in the training mode. An output of *D/A* converter 68 is connected to a 2 kc. phase lock loop (PLL) 70 which has outputs connected both to an 84 kc. PLL 72 and to a pulse shaper 74 as well as a divide by 10 block 76. Block 76 is connected to a pulse shaper 78 which has an output connected to each of terminals K, Q, and E. Block 72 is connected through a pulse shaper 80 to output terminal D. Block 72 is also connected to provide inputs to a 1.764 megacycle phase lock loop 82 and to provide an input to a pulse shaper 84 which has a gating output connected to the summing means 62 and also provides a gating output to terminal N. Block 72 also provides an output to terminal P. The pulse shaper 74 provides an output to terminal R and also provides an input to a 6 microsecond pulse generator 86 through an adjustable pulse delay block 88. The generator 86 provides a gating pulse to gate 90 which is connected through an integrator 92 to output terminal F. An input T is connected through an inverter 94 to provide an input to a summing means 96. Summing means 96 also receives inputs from terminal S and from the *D/A* converter 68 and provides an input to gate 90.

The previously mentioned mode select switch 30 of FIGURE 4 also receives inputs from terminals H and J. Block 30 provides an output to a 21 stage shift register 100. The gating signal input terminal N is connected through an adjustable pulse delay circuit 102 to a storage unit for 3 bit words which will receive the words at 84,000 words per second and will provide serial binary data out at 252,000 bits per second and is designated as 104. Terminal N also provides a gating input to the register 100. The 21 stage register 100 provides 20 outputs, with the middle shift register output unattached, to 20 gates 106. Because of space limitations only 2 of the gates are shown. Each of the gates 106 is connected through an integrator 108 and a limiter 110 to a respective gate 112. The first gate 112 is connected to the up-down counter 66–20 while the last gate 112 is connected to up-down counter 66–1. Each of the intermediate gates are connected to the up-down counter occupying a conjugate position in the X register. Terminal M is connected through an adder 114 to a block 116 which drops the bits 1, 2, 3, and 6 from the data received before supplying the remaining 3-bit signal to storage unit 104. An output from block 116 is also connected through the previously mentioned gate 34 to a *D/A* converter 118. The converter 118 is a three-bit converter and has an output connected to terminal T. Terminal P supplies an 84 kc. signal to a 100 kc. low pass filter 120. Block 120 is connected through a half-wave rectifier 122 and through a band pass filter to the storage unit 104. The output from the band pass filter 124, which is a 252 kc. clock signal is also supplied through first and second frequency doublers 126 and 128 to a terminal 130 which provides 1.008 megacycle clock pulses. An input terminal Q provides a gating signal at 200 pulses per second in the training mode to block 32. An input terminal R also supplies an input gating signal to block 32 at 2000 pulses per second in the data mode and further supplies an input to an adjustable pulse delay block 132. An output of the block 132 is connected through a pulse generator 134 to a 3 bit gate 136. A block designated as 138 which provides a digital reference word for an inverted probe pulse of 3 bits in length is connected through the gate 136 to the adder 114. Block 138 is also connected through a *D/A* converter 140 to output terminal S. Switch 32 is connected through an adjustable pulse delay circuit 140 and also through a 6 microsecond pulse generator 142 to each of the gates 106.

OPERATION OF DIGITAL VERSION OF EQUALIZER

The operation of the digital equalizer will now be given in two sections. The first section will be the operation of the device in a training mode to set up the multiplier 64 to the proper values for data transmission and the data mode wherein data is being transmitted and the multipliers 64 are further adjusted around the initial value set in the training mode. While it is not necessary to operate the digital version in both modes, equalization is accomplished much quicker by first training the device and then allowing it to run with data from input 10.

The clock 12 is a synchronous demodulator which is part of the data link and is comparable to unit 28, of FIGURE 1. The probe pulse is demodulated by this unit and passed through the low pass filter 16 and the AGC amplifier 20 to the *A/D* converter 38. In the converter 38 the probe pulse, which is a negative periodic pulse, is converted to a 7 bit designation. By way of explanation, the *A/D* converter 38 is a binary unit which provides an output wherein the 7th bit is zero if the input is negative and is a 1 if the input signal is positive. The other 6 bits represent the amplitude of the absolute value of the input signal starting from all zeros at the minimum input and increasing to all ones in either direction from the minimum input to a maximum input. Further, the probe pulse is periodic and the 2 kc. PLL 70 is locked to the periodicity thereof. The PLL 70 constitutes part of a synchronous signal extraction circuit. The 7 bit words out of converter 38 are stored in the X register 60, a digital delay line, where they are shifted to the right as each new word is entered. Unit 60 should of course be long enough to store all the samples corresponding to the significant portion of the channel pulse response. Each word is multiplied by the output from the up-down counter 66 in the multiplier 64 in each stage of the register 60. The 7 bit storage unit 67 will receive the values of the peaks and zeros of the pulse response from each of the multiplier 64 by means of summing means 62 for each stage of advance of the probe pulse. When the system is equalized, there should be no effective input from the probe pulse into the storage unit 67 when the unit is in the training mode except when the probe pulse reaches the stage X which has no multiplier between the unit 60 and the summing means 62.

The entire synchronization of the receiver is derived from the periodic probe pulse. The output of the *D/A* converter 68 which has received the probe pulse from storage unit 67 will be periodic with a fundamental period equal to that of the probe pulse. This signal in the embodiment shown is a 2 kc. signal. This signal is detected by the PLL 70. This basic or fundamental 2 kc. signal is utilized to obtain 84 kc. out of the PLL 72 and from there to derive other frequencies out of the various units 82, 84, 122 and 128. The high frequency of 1.764 megacycles from the unit 82 is used to gate the multiplier 64 so as to be used as a time shared unit. However, this feature forms no part of the present invention since various types of multipliers could be used which are time shared or not as is desired for a particular application. The 84 kc. signal from block 72 is shaped by pulse shaper 80 and delayed in phase by unit 44 a fixed amount to compensate for the computational delay and the constant phase error from the phase lock loop 70 so that the *A/D* converter 38 samples the input signal at the proper time. The 1.008 megacycle clock pulse obtained from frequency doubler 128 is used in the storage unit 104 to clock the binary data out of the equalizer.

In addition to a requirement that the system by synchronized, the gain of the system must be normalized to a given amplitude output. This normalization is necessary if converter 38 is to give the correct binary sequence at the output. Thus, the input signal through capacitor 36 is corrected by the AGC amplifier 20. It is necessary that the amplitude of this signal be exactly the same amplitude as the signal obtained from the digital reference 138 which is identical to the amplitude of the transmitted probe pulse. An error voltage is obtained by comparing the peak amplitude of the probe pulse with a reference level stored in unit 138 and applied to the summing means 96. The output of storage unit 67 is converted to an analog signal by *D/A* converter 68 and also applied to the summing means. Since the two inputs are of opposite polarity, the difference is applied through gate 90 to integrator 92 and from there to amplifier 46 and then through switch 50 to summing means 42. In summing means 42 the error signal is adjusted against a bias voltage and applied back to the AGC unit 20 to provide the proper amplitude probe pulse. The gate 90 is allowed to conduct only when the peak of the probe is present at the output of the *D/A* converter 68. The gate 90 is allowed to conduct for 6 microseconds. As the system becomes normalized, the output from the summing means 96 will become less and less.

The weighting values of the up-down counters 66 are adjusted by noting the polarity of the pulse response at the times that it is supposed to be zero. Bit No. 7 out of storage unit 67 represents the polarity of the system pulse response at these times. As will be remembered, the converter 38 provides an output wherein the 7th bit is either a zero or one depending upon whether the input is negative or positive. Further, the converter produces this output information each sample time and not just when a pulse is received. This information is sequentially stored in register 60 and shifted down the length of register 60. During the training mode the 7 bit storage unit 67 stores the sum of the 21 words out of the multipliers 64 and provides the resultant of all of the 7th bits at an output which is connected to the switch 30. This information is then applied to the shift register 100. Since there is an odd number of words there must be more of one polarity indication than the other. It may be assumed that there are more positive outputs from the X register 60 than there are negative or zero outputs and thus a one is stored in the shift register for the first sign bit. During the next gating of the register 60, it may be that the summation of the signals supplied to the storage unit 66 produces a negative or zero bit. This is then stored in the shift register 100. Once every 10 operations or once every 10 times a probe pulse is received, a pulse is received from generator 142 to gate the gates 106. This signal is then applied to the integrators which provide an output to the gates 112 and from there to the respective up-down counters. If the input to the counter is of one polarity it will count up and if it is of the opposite polarity it will count down. This operation can be performed in many different ways and the method shown is to provide two inputs to gate 112 for gating purposes so that two separate inputs to the up-down counter can be used. However it is to be realized that some up-down counters will require only one input and will count either up or down depending upon the polarity of the input. In the embodiment shown, the gating pulse for gates 106 occurs 122 microseconds after the probe pulse reaches the X tap of the register 60. Since gates 106 are gated only every tenth probe pulse, the integrators 108 have enough time to discharge to essentially zero between successive inputs. This allows the system to react to the signal before another instruction is given. If there is no input to the integrator, there will be no change in the up-down counter 66. If there is an input to the integrator, the up-down counter will change one bit and will not change further until another input is received from the integrator 108 to indicate that the output still is not proper. As will be realized, the up-down counter is changed by an amount equal to its least significant bit and not by the most significant bit.

The system is now equalized so that when a probe pulse is received from an input 10 there is no output from the summing means 62 to the 7 bit storage 67 except when the probe reaches tap X of register 60. At all other times the summation of the outputs from register 60 times the correction factors from the up-down counters 66 will produce a net result or summation of zero to the summing means 62.

As will be noted there are several mode select training or data switches throughout the block diagram such as blocks 30, 32, 48, 50 and also gate 34 which is labeled somewhat differently. Also of these last mentioned gates operate simultaneously so as to select between input signals or to allow passage of an input signal. In the training mode there is not enough power presented to the automatic gain control circuit to actuate the threshold detector 28 from the rectifier 24 and the integrator 26. Thus, the switch 30 allows the input signal indicated as the training line for bit number 7 to be passed to the output. The block 32 allows the 200 pulse per second input to be passed to the output. The gate 34 is rendered non-conductive. Switch 50 allows the signal from amplifier 46 to be passed therethrough to the summing means 42 and prevents the signal from the *D/A* converter 58 from flowing therethrough. Switch 48 does not allow the signal from terminal F to flow but does allow the signal from the difference amplifier 52 to flow therethrough to the generator 54.

After the training mode is over, the transmitter initiates the data transmission mode by adding a pulse amplitude modulated (PAM) data signal synchronously with the periodic probe signal. The receiver recognizes the change to the data mode by detecting the increased power being transmitted through the channel. This is done by the previously mentioned threshold detector 28 which changes all the previously mentioned gates 30, 32, 34, 48 and 50 to the opposite condition.

In the data reception mode of operation the differences are in the method of adjustment of the weighting values of up-down counter 66, the removal of the probe pulse and the truncation of the output of adder 114 and the normalization of the system gating.

In the data mode the storage unit 67 represents the equalized and quantized PAM signal plus the probe. The probe pulse is removed from unit 67 by digitally adding an inverted probe pulse to the output from storage unit 67. The inverted digital reference word is obtained from reference block 138 at the basic pulse rate of 2 kc. through the three bit gate 136 to adder 114. Since this digital reference pulse is of the opposite polarity from the received pulse, the two will cancel in adder 114 and the resultant will be the remaining equalized data signal. Due to computational delays, the signal from 138 is gated to adder 114 approximately three microseconds after the peak of the probe pulse is transferred from the register 60 to the storage unit 67.

The transmitter of the signal uses three binary digits to represent an 8 level PAM signal. The output of storage unit 67 is a sequence of 7 bit binary words because of the quantization of the analog input by converter 38 to 7 bits. Since bit 7 is used to represent polarity, bit number 6 will be the most significant bit. Bit number 6 will normally be zero except for the binary word out of storage unit 67 which represents the peak of the pulse response plus the data. Bit number 6 thus is always zero at the time that it reaches the block 116. Bit number 3 is used to correct up-down counters 66 and bits 1 and 2 are insignificant. Thus, there are only three bits of interest to the storage unit 104. These bits are 4 and 5 which represent in binary fashion the amplitude of 4 levels plus the seventh bit which indicates the polarity of the 4 levels whether they are positive or negative. Thus, bits 1, 2, 3, and 6 are dropped in block 116. For the embodiment shown, the output of block 104 is serial binary data being provided at a rate of 252,000 bits per second. As may be determined, the signal for clocking the binary data out of unit 104 is obtained from the band pass filter unit 124.

As previously mentioned when data is being received the mode select switches are actuated. In this mode, bit number 3 from unit 67 is applied to the shift register 100 to provide information as to the correct level of the probe signal plus the PAM signal. As will be realized, the combination of the probe signal and the PAM signal can be any of 8 levels. The third bit however as will be realized from an intensive study of the output information obtained from converter 38 for each possible input level will change from a zero to a one at each of these 8 levels. Thus, the information of the third bit is used to correct the value of the up-down counters 66 when the data channel characteristics change. Thus as can be seen by those skilled in the art, the intersymbol interference due to the probe pulse is the signal which is used to correct the weighting values of the up-down counter 66.

The average value of the interference from the data pulses will be zero if the data is random with zero mean. Since it was specified at the beginning of this specification that the data signals must have an average of zero, this requirement is met. Over the long run the interference from the pulse probe will be the same for each probe cycle. The polarity of the interference is stored in shift register 100 by means of bit 3 as previously mentioned. However, in view of the operation of switch 32, the polarity of the interference signals received by shift register 100 from the storage unit 67 is gated by gates 106 to the integrators 108 every 122 microseconds after the peak of the pulse response occurs at tap X of the register 60 in the embodiment shown. The integrators average the random component of the output of register 100 caused by noise and data. The time constants of the integrators are long enough so that a good estimate is obtained from the polarity of the probe intersymbol interference at each sample point of the equalized system output. The polarity of these estimates determine whether the respective counters 66 are increased or decreased in the same manner as in the no-data mode. The gates 112 are still gated at the same rate as previously and thus every tenth probe pulse they are turned on to allow the output of the integrators 108 to be applied to the counters 66. Thus in the same general manner the system is again equalized as it was in the training mode.

When the system was in the training mode, normalization was supplied by comparing the probe pulse output from the storage unit 67 as converted through the converter 68 with the output from the reference unit 138. The error signal obtained from the combination of these two signals was then applied through the integrator 92, the amplifier 46, switch 50 and summing means 42 to the automatic gain control unit 20. In addition, the signal from the output of amplifier 46 is applied to the difference amplifier 52. Initially, there will be no input to amplifier 52 from the converter 58. Thus an output will be obtained from amplifier 52 and applied through the switch 48 to the pulse generator 54. This will cause the counter 56 to count in one direction or the other so that the input to difference amplifier 52 from converter 58 equals the output from amplifier 46. Thus, when data is received and the switch 48 is switched to the opposite condition the input to the AGC unit 20 will not change initially. This is the result of having the up-down counter 56 already providing an output which has the same amplitude as the AGC unit 20 previously received.

In the data mode, the summing means not only receives the output from storage unit 67 and the reference signal from block 138 but also receives the signal from the output of block 116 which is representative of the correct amplitude of the PAM signal. Since the inputs from blocks 116 and 138 are indicative of the correct total amplitude of the PAM signal then the difference between these two inputs and the input from storage unit 67 will provide an error signal to the integrator 92, which is used to further correct the up-down counter 56, and thus apply a signal through the switch 58 to the AGC unit 20 to keep the system gain at the correct amount.

It should be noted that the subtraction of the PAM signal from the input to the integrator 92 reduces the input noise power to the integrator 92 by a large factor. The time constant of the integrator 92 can thus be reduced accordingly and this gives the system the capability of responding more rapidly to system gain variations without any degradation in performance.

Each of the portions of the system have been shown as block diagrams rather than as actual circuits. It is believed that each of the blocks can be shown in the prior art and are standard units which are known to those skilled in the art and can be filled in by those skilled in the art without any particular difficulty. Further, if the individual circuitry were shown for each of the blocks of the resultant specification and drawings would become unnecessarily bulky.

While specific frequencies and storage capacities etc. are given in the specification it is to be realized that the invention is broader than these specifics.

What is claimed is:

1. Automatic channel equalization apparatus for use with a statistically independent, pulse modulated intelligence signal with an average of zero which has been combined with a periodically recurring probe pulse which signal has been distorted by transmission through a data channel comprising, in combination:

input means for supplying a channel distorted signal;

delay line means including N taps connected to receive signals from said input means;

summing means including output means for supplying an output signal therefrom;

($N$—1) signal amplitude adjusting means connected between ($N$—1) taps of said delay line means and said summing means;

means connecting the remaining one of said N taps to said summing means;

integraitng means;

gating means connected between said summing means and said integrating means for applying to said integrating means at periodic sample times a signal representative of the total signal received by said summing means when said probe pulse arrives at each tap of said delay line means; and means connecting said integrating means to said ($N$—1) adjusting means in a feedback manner for adjusting the signal therethrough to provide a minimum average output from said summing means at said sample times.

2. Automatic channel equalization apparatus for use with a statistically independent, pulse amplitude modulated intelligence signal with an average of zero which has been combined with a periodically recurring probe pulse which signal has been distorted by transmission through a data channel comprising, in combination:

input means for supplying the channel distorted signal;

delay line means including ($N$—1) taps and an intermediate J tap for a total of N taps;

gain control means connected between said input means and delay line means for controlling the gain of signals flowing therethrough;

summing means including output means;

($N$—1) signal amplitude adjusting means connected between corresponding ($N$—1) taps of said delay line means and said summing means;

means connecting said J tap to said summing means;

N integrating means;

N gating means connected between said summing means and corresponding ones of said N integrating means for applying to each one of said N integrating means a signal representative of the total signal received by said summing means when said probe pulse arrives at each corresponding tap of said delay line means;

means connecting ($N$—1) of said integrating means to corresponding one of said ($N$—1) adjusting means for adjusting the signal therethrough to provide a minimum average intersymbol interference output from said summing means;

means connecting the remaining integrating means corresponding to said J tap to said gain control means for adjusting the gain thereof to provide a constant amplitude probe pulse at said summing means when said probe pulse appears at said J tap; and probe extraction means connected to said summing means for removing the probe pulse from the total signal and providing an output signal representative of the originally transmitted intelligence signal.

3. Data receiving apparatus for use with a synchronous modulation-demodulation data link wherein the signals being transmitted comprise data which is statistically independent, pulse amplitude modulated and has an average of zero combined with a constant amplitude periodically recurring probe pulses, in combination:

first means for supplying an input signal to the receiving apparatus from the data link;

synchronization means for providing a first output signal representative of the probe signal and for providing a second output signal for use as a gating signal;

automatic gain control means including a control input for varying the gain thereof;

means connected between said first means and said automatic gain control means for supplying the received signal thereto;

delay line means including an input means, a plurality of taps and additionally an intermediate tap;

means connecting said automatic gain control means to said input means of said delay line for supplying the input signal thereto adjusted in amplitude in accordance with a control signal supplied to said automatic gain control means;

a plurality of adjusting means each connected to a single one of said plurality of taps of said delay line means and each including control inputs for controlling an output signal therefrom with respect to signals received from said plurality of taps;

summing means connected to each of said adjusting means and to said intermediate tap for receiving signals therefrom, said summing means including output means;

a plurality of gating means each connected to receive signals from the output of said summing means, each of said plurality of gating means including a second gating input and an output;

a plurality of integration means connected to said plurality of gating means for receiving signals therefrom indicative of apparatus deviation from equalization as the probe pulse arrives at each tap of said delay line means, each individual integration means receiving equalization information generated when the probe pulse arrives at a corresponding tap, said integration means averaging out the data information to zero and providing as an output substantially only equalization information due to the probe pulses;

means connecting each of said plurality of integration means to a corresponding one of said plurality of adjusting means to control the output signal therefrom to a minimum average intersymbol interference signal level at said output means of said summing means level;

further gate means connected to said output means of said summing means for actuation at a time corresponding to receipt of said probe signal at said intermediate tap and connected to said control means for controlling the amplitude of the signal supplied to said delay line means toward a predetermined value; and probe extraction means connected to receive the output signal from said summing means for receiving the signal indicative of said probe signal therefrom, said probe extraction means providing an output signal indicative of the originally supplied data signal at said transmitter end.

4. Data receiving apparatus for use with a synchronous modulation-demodulation data link wherein the signals being transmitted comprise data which is of the statistically independent, pulse amplitude modulated type having an average of zero combined with a periodically recurring probe of a lower frequency than the data comprising, in combination:

apparatus input means for supplying an input signal to the receiving apparatus from the data link;

synchronized detection means for providing a first output signal representative of the probe signal and for providing a second output signal for use as a gating signal;

automatic gain control means including a control input for varying the gain thereof and a signal input means;

means connected between said apparatus input means and said input means of said automatic gain control means for supplying the received signal thereto;

delay means including an input means, a plurality of output taps and also an intermediate output tap;

means connecting said automatic gain control means to said input means of said delay means for supplying the input signal thereto adjusted in amplitude in accordance with a control signal supplied to said automatic gain control means;

a plurality of adjusting means one of said plurality of adjusting means connected to each of said plurality of taps of said delay means and each including control inputs for controlling an output signal therefrom with respect to signals received from said plurality of taps;

summing means connected to each of said plurality of adjusting means and to said intermediate tap for receiving signals therefrom simultaneously, said summing means including output means;

a plurality of gating means each connected to the output of said summing means, each of said plurality of gating means including a second gating input and an output;

shift register means including a plurality of outputs connected to said second gating input of said gating means for gating said plurality of gating means consecutively;

means connecting said synchronized detection means to said shift register means for actuating said shift register means upon each occurrence of said probe signal;

means connecting each of said plurality of gating means to a corresponding one of said plurality of adjusting means to control the output signal therefrom for providing a minimum intersymbol interference output from said summing means;

further gate means connected to said shift register means and to said output means of said summing means for actuation at a time corresponding to receipt of said probe signal at said intermediate tap and connected to said automatic gain control means for controlling the amplitude of the signal supplied to said delay means toward a predetermined value; and probe extraction means connected to receive the output signal from said summing means and connected to said synchronized detection means for receiving the signal indicative of said probe signal therefrom, said probe extraction means providing an output signal indicative of the originally supplied data signal at said transmitter end.

5. The method of reconstructing the intelligence content of a statistically independent, pulse amplitude modulated signal with an average of zero combined with a lower frequency periodically recurring probe signal at a receiver after the combined signal has been transmitted through a synchronous modulation-demodulation data link comprising the steps of:

delaying the signal in discrete time period steps;

sequentially sampling the delayed signal for determining the amplitude of the probe signal portion thereof at each time period step;

producing a probe signal equivalent to said transmitted probe signal;

adjusting the amplitude of each of said sampled signals, other than a signal appearing at a reference time period step, through the use of the produced probe signal, toward a value which produces a minimum output thereby allowing only the signal appearing at said reference time period step to be passed as an output signal; and adjusting the amplitude of the signal being delayed in accordance with the amplitude of the sampled probe signal when sampled during the referenced time period.

6. The method of claim 5 including the adidtional step of integrating the sampled signals before using them to adjust the amplitude of the signals sample to a minimum value.

References Cited

UNITED STATES PATENTS

| | | | |
|---|---|---|---|
| 3,179,889 | 4/1965 | King | 325—41 X |
| 3,368,168 | 2/1968 | Lucky | 333—18 |
| 3,292,110 | 12/1966 | Becker et al. | 333—18 |

RALPH D. BLAKESLEE, *Primary Examiner.*

J. A. BRODSKY, *Assistant Examiner.*

U.S. Cl. X.R.

325—65, 323; 333—18